United States Patent [19]

Pannekeet et al.

[11] 4,160,675

[45] Jul. 10, 1979

[54] PROCESS FOR PURIFYING AN AQUEOUS SOLUTION

[75] Inventors: Wilhelmus Pannekeet, Haarlem; Robert Smakman, Nigtevecht, both of Netherlands

[73] Assignee: Akzona Incorporated, Asheville, N.C.

[21] Appl. No.: 832,126

[22] Filed: Sep. 12, 1977

[30] Foreign Application Priority Data

Sep. 17, 1976 [NL] Netherlands .......................... 7610396

[51] Int. Cl.$^2$ ........................... C13D 3/12; C13D 3/14
[52] U.S. Cl. ..................................... 127/46 A; 127/37; 127/55; 210/24; 210/38 R
[58] Field of Search ............... 210/24, 38 R, 39, 38 B; 127/37, 46 A, 55; 526/286–289; 528/150

[56] References Cited

U.S. PATENT DOCUMENTS

| 3,370,021 | 2/1968 | Kohn et al. | 210/24 R |
| 3,864,327 | 2/1975 | Marchant | 210/24 R |
| 4,040,861 | 8/1977 | Walon | 127/46 A |

FOREIGN PATENT DOCUMENTS 45-882 11/1972 Japan .......................................... 210/39

*Primary Examiner*—Ferris H. Lander
*Attorney, Agent, or Firm*—Francis W. Young; Robert F. Green

[57] ABSTRACT

A process for removing an organic impurity from an aqueous solution is disclosed, said process comprising contacting the aqueous solution with an acid cation exchanger and subsequently with a polymer or polycondensate, which contains sulfur in the form of thiol groups bonded to carbon atoms.

14 Claims, No Drawings

PROCESS FOR PURIFYING AN AQUEOUS SOLUTION

BACKGROUND OF THE INVENTION

This invention relates to a process for removing an organic impurity from an aqueous solution, as by means of a sorption agent.

Sorption agents known to be used for purifying aqueous solutions are, for instance, active carbons, sulfonated carbon and ion-exchanging resins. In this connection it is known from the published Netherlands Patent Application No. 128,345 that colorants may be removed by means of a cation-exchanging resin containing sulfonic acid groups, carboxylic acid groups, phosphonic acid groups or phosphinic acid groups, with the matrix having a macroporous sponge structure. Such a structure was considered necessary because the cation exchangers known at that time were regarded as insufficiently effective (see Ind. & Eng. Chem. 41 (1949), 2521) Furthermore, from the Netherlands Patent Application No. 7,107,198 it is known that a sugar solution may be purified by bringing it into contact with a cation exchanger which has an acidity ($pK_a$) in the range of 3 to 6, as a result of which in the sugar solution a buffered medium having a pH value between 3 and 5 if formed.

SUMMARY OF THE INVENTION

Surprisingly, it has now been found that by using a specific type of sulfur-containing polymer or polycondensate as the sorption agent, it is possible for an organic impurity, which usually is a color or color-forming body, to be removed to a very high degree.

The process according to the invention comprises sequentially contacting the aqueous solution with an acid cation exchanger and subsequently with a polymer or polycondensate, which contains sulfur in the form of thiol groups bonded to carbon atoms.

DESCRIPTION OF THE PREFERRED EMBODIMENTS

Although in principle any water-insoluble, macromolecular compound which contains the sulfur in the desired form may be used as matrix for the sorption agent, the matrix to be employed in the process according to the invention is a polymer or polycondensate. The particular structure of the polymer or polycondensate is not critical. If a polymer is to be employed, then the monomer to be used in the preparation thereof may be, for example, a monovinyl aromatic compound, such as styrene, vinyl toluene, vinyl ethyl benzene, vinyl naphthalene and vinyl anisole or mixtures of the aforementioned compounds. It is preferred that styrene be used as the monomer.

During polymerization, there may be present, besides the monovinyl aromatic compound(s), a cross-linking monomer, for instance in an amount not exceeding 80% by weight, calculated on the total amount of monomers. As cross-linking monomer there may be used a compound having at least two ethylenically unsaturated groups, such as 1,3-butadiene, isoprene or vinyl methacrylate, but preference is given to the use of di- or polyvinyl aromatic compounds such as divinyl ethyl benzene, trivinyl benzene, and more particularly, technical divinyl benzene. As the polycondensate there may be employed, for instance, a phenol-formaldehyde resin; and in the preparation thereof not only phenol itself, but also other phenols, such as cresols and diphenylolpropane may be employed.

The polymer may be prepared in any suitable manner, for instance, by suspension polymerization of one or more monomers at temperatures generally in the range of 10° to 160° C. in the presence of a radical initiator such as benzoyl peroxide, lauroyl peroxide and/or cumene hydroperoxide. The polymerization may be carried out, if desired, in the presence of one or more compounds which serve to precipitate and/or solvate the polymer to be prepared; for instance: hexane, heptane, cyclohexane, amyl alcohol, cyclohexanol, benzene, toluene and/or chlorobenzene. In the monomeric compound(s) there may also have been dissolved a linear polymer, such as polystyrene.

The incorporation of thiol groups into the matrix may be carried out in any suitable manner, for instance by reacting the matrix with a compound composed of sulfur and chlorine (hereinafter referred to as sulfur chloride) in the presence of a catalyst, followed by reduction of the resulting polymer containing sulfide groups or polysulfide groups. As sulfur chloride there may be used then sulfur monochloride or a mixture of sulfur chlorides having the general formula $Cl-(S)_n-Cl$, where n=1-3. Such compounds are formed in a very simple way; for instance, by reacting sulfur which chlorine or a chlorine source, such as in a suspension of sulfur in tetrachloromethane. The sulfur chloride also may be prepared during the reaction with the matrix, in situ. It is preferred that distilled technical sulfur monochloride should be used. The sulfur chloride is generally employed in an amount of 0.9–4 parts by weight per part by weight of polymer.

The catalyst to be used in the reaction with the sulfur chloride may for instance be a Lewis acid, such as borium trifluoride, ferric chloride, aluminium trichloride, toluene sulphonic acid and preferably chlorosulphonic acid or sulphuric acid. Excellent results are obtained if the catalyst is used in an amount of about 0.01–5 parts by weight per part by weight of polymer. The treatment of the matrix with sulfur chloride is preferably carried out in an inert diluent such as liquid sulfur dioxide, carbon disulfide or a halogenated hydrocarbon such as dichloroethane. The sulfurated matrix may subsequently be reduced, for instance, by means of sodium sulfide or with a hydroxide, such as sodium hydroxide, in combination if desired, with sulfur. The reduction is generally carried out at a temperature in the range of 50° C. to 150° C., and preferably 80° to 90° C. (see also the Netherlands Patent Application No. 6,805,305).

Another method of incorporating thiol groups into the matrix consists in that the matrix is chlorosulfonated followed by reduction with a polysulfide (see the German Patent Specification No. 1,067,217) or for instance, by chloromethylation of the matrix followed by reaction with thiourea and hydrolysis of the formed isothiouronium salt to the corresponding methylene mercaptan resin (see the Belgian Patent Specification No. 636,250).

Use may further be made of sorption agents with the matrix containing structures of the

type. Although these structures are in tautomeric equilibrium with the structure

matrices containing these structures display the same decolouring action as those containing the afore-described thiol groups. Sorption agents having such a structure may be prepared in various ways, for instance by (a) reaction of nitrile groups in a (co) polymer of (meth)acrylonitrile with hydrogen sulfide or a sulfide solution, (b) polycondensation of thiourea with, for example, formaldehyde and a phenol, optionally in the presence of other polycondensation components such as urea and amines, (c) reaction of matrices which contain primary or secondary amino-, hydrazido-, or polyalkylene-polyamino groups with sulfur-containing compounds, such as a thiorhodanide, a thiourea, carbon disulfide, an isothiocyanate, or a thiobiuret, or (d) reaction of matrices which contain isothiocyanate groups with nitrogen-containing compounds such as ammonia, primary or secondary amines, hydrazines or polyamines to form matrices containing corresponding thioureido or thiosemicarbazido groups. The above-mentioned conversions are known from, for instance, the German Patent Application Nos. 2,312,233 and 2,314,756, and need not be further described herein.

The thiol groups-containing matrix is referred to hereinafter as thiol resin. Although the thiol group content of the resin is not critical, it is preferred that use should be made of a thiol resin which contains at least 1200 meq. thiol groups or thiolate groups per liter of thiol resin. Besides the aforementioned structures with thiol groups or thiolate groups the thiol resin may, if desired, contain other groups, for instance, $SO_3H-$ or $SO_2H-$ groups or, for example, $-S-$ or $-S-S-$ bridges between the aromatic rings.

The sorption agents to be used in the process according to the invention are found to be particularly suitable for the removal of colorants or color-forming compounds which are hardly or not dissociated in an acid medium. These colorants comprise, for instance, the thermal decomposition products of sugars, alkaline decomposition products of sugars, reaction products of amino acids and hexoses, and hydroxymethyl furfural.

Although the process according to the invention may, of course, be applied to all kinds of aqueous solutions containing any type of organic impurity, for instance: aqueous solutions of formaldehyde resins, it is of particular importance for solutions of carbohydrates and solutions of substances which may be obtained in the recovery and/or preparation of carbohydrates from intermediate and residual products. As such, there may be mentioned, for example, the removal of color or color-forming compounds from starch hydrolysates, such as glucose syrup, dextrose and high fructose-glucose syrups; saccharose solutions; solutions of sugars obtained by hydrolysis of cellulose, as of, for instance, xylose and mannose and solutions of lactulose. The process according to the invention may also with advantage be used for purifying solutions of a dialcohol or polyalcohol, such as glycol, glycerol, sorbitol or an oxidation product thereof.

In order that full advantage may be taken of the effectiveness of the sorption agents used in the process according to the invention, the aqueous solutions are pre-contacted with a cation exchanger in the acid form, as a result of which hindering cations may be removed and, moreover, the desired pH, mostly from about 1 to about 4, of the solution is obtained. As cation exchangers there may be used, for example, an exchanger with weakly acid and/or strongly acid groups, such as carboxyl groups, phosphoric acid groups and sulphonic acid groups. It is preferred that use should be made of a strongly acid cation exchanger, more particularly, one with sulphonic acid groups. Examples of a resin containing sulphonic acid groups are those that are marketed by Akzo Chemie B.V. under the trademark IMAC C 16 P and IMAC C 12. These strongly acid resins may be regenerated in a known manner, for instance, with a HCl solution.

A known way of bringing the thiol resin used as sorption agent in the process according to the invention in the $H^+$-form consists in that the said resin is, for instance, treated with an aqueous solution of hydrochloric acid or sulfuric acid. In a number of cases the presence in the thiol resin of sulfonic acid groups may give rise to undesirable side effects, such as the formation of invert products in the decoloration of saccharose solutions. Such an undesirable side effect may be prevented by neutralizing these sulfonic acid groups, for instance, by treating the thiol resin with an aqueous solution of sodium chloride.

Regeneration of the thiol resin used in the process according to the invention may be effected in a known manner, for instance, by treating it with an alkali solution, such as a solution of sodium hydroxide or ammonia and subsequently washing it with soft or demineralized water. Over such sorption agents as sulfonated carbon used in practice for said envisaged purpose, the thiol to be used according to the invention shows several advantages, namely the ready regeneration of sorbed colorants; the lower aging rate, which makes it possible for the thiol resin to be used more often; and particularly the need for only a small amount of washing water. Moreover, quality control in the preparation of the synthetic sorption agent makes it possible to obtain a better control of the structure and hence, of the chemical and mechanical properties and a more uniform porosity.

The invention will be further described in the following Examples, which are illustrative only and not limitations upon the scope of the invention. In the Examples the absorbance was measured in a 1 cm cell, except in cases where a different path length is given. The wave length of measurement is mentioned in brackets after the absorbance value.

EXAMPLE I

In this Example use was made of a thiol resin having a styrene-divinyl benzene matrix containing thiol groups bonded to the aromatic ring, which resin had been prepared as follows:

The preparation was started from 100 grams of a macroporous copolymer composed of 90% by weight of styrene and 10% by weight of divinyl benzene, having an apparent density of 0.6 and obtained by suspension polymerization in the presence of a mixture of 15 grams of toluene and 80 grams of heptane per 100 grams of monomer. The macroporous copolymer was swollen in 600 milliliters of dichloroethane, after which 250 grams of sulfur chloride and 50 grams of chlorosulphonic acid were added, and the mixture was stirred for 6 hours at 80° C. Subsequently, the reaction mixture was poured into water. The copolymer beads were then treated with an aqueous solution of 4 grams of sodium sulfide (with 9 moles of water of crystallization) for 8 hours at a temperature of 90° C. and subsequently washed with water. The resulting thiol resin contained 1400 milliequivalents of thiol groups per liter of resin. A sucrose solution having a strength of 14.5 Bx, a pH of 9.5, a purity of 89.3% and an absorbance of 0.432 (560 nm) was, at a percolation rate of 1200 milliliters per hour and at a temperature of 10° to 15° C., passed through a first column containing 200 milliliters of a glass-like sulfonic acid cation exchanger (H+-form), the matrix of which was composed of 92% by weight of styrene and 8% by weight of divinyl benzene and subsequently, at the same percolation rate and temperature, for the purpose of decoloration, through a second column filled with 200 milliliters of the above-described thiol resin, which had been regenerated with 200 milliliters of 7.5%—HCl solution for 60 minutes at 20° C. and washed with 1000 milliliters of soft water for 30 minutes at 20° C. When it emerged from the column containing the strongly acid cation exchanger, the sucrose solution, after its pH value had been brought to 9.5, had a mean absorbance of 0.420 (560 nm). As soon as the concentration of the thin sucrose solution had attained a strength of 1° Bx after it had left the thiol resin column, 800 milliliters of percolate were brought to the original pH of 9.5 with a 10%—$Na_2CO_3$ solution and its absorbance was measured (see Table 1). Table 1 also lists the pH values of the percolate prior to neutralization with the $Na_2CO_3$ solution. Table 1, moreover, gives the pH values prior to neutralization and the absorbance values of the percolate measured in repeating the procedure in this example without making use of the sulphonic acid cation exchanger.

TABLE 1

| | with sulfonic acid cation exchanger | | without sulfonic acid cation exchanger | |
|---|---|---|---|---|
| Percolate | pH before neutralization | color absorbance (560 nm) | pH before neutralization | color absorbance (560 nM) |
| 0– 800 ml | 1.9 | 0.004 | 2.0 | 0.020 |
| 800–1600 ml | 1.9 | 0.006 | 3.6 | 0.066 |
| 1600–2400 ml | 2.0 | 0.006 | 4.8 | 0.152 |
| 2400–3200 ml | 2.2 | 0.008 | 5.2 | 0.208 |
| 3200–4000 ml | 2.7 | 0.040 | 5.6 | 0.314 |
| 4000–4800 ml | 3.5 | 0.092 | 6.0 | 0.340 |

EXAMPLE II

A lactulose solution having a strength of 35.2 Bx, a pH of 6.15 and an absorbance of 1.06 (440 nm) was first passed through a column containing 200 milliliters of a macroporous sulfonic acid cation exchanger (H+-form) at a percolation rate of 400 milliliters per hour and at a temperature of 20° C. and subsequently, for the purpose of decoloration, through a column containing 200 milliliters of the thiol resin, as used in Example I. When it left the column, the lactulose solution, after being brought to a pH value of 6.15, had a mean absorbance of 0.95 (440 nm). After the two columns had been sweetened to 5° Bx, each time 400 milliliters of percolate were brought to the initial pH value of 6.15 with a 10%—$Na_2CO_3$ solution and the absorbance was measured (see Table 2).

TABLE 2

| Percolate | pH before neutralization | color absorbance (440 nm) |
|---|---|---|
| 0–400 ml | 2.35 | 0.152 |
| 400–800 ml | 2.25 | 0.325 |
| 800–1200 ml | 2.25 | 0.370 |

EXAMPLE III

In this Example a solution of a dextrose mother liquor (Hydrol) having a strength of 5.2° Bx and a pH of 4.4 was decolored. The solution shows an absorbance at 420 nm (measured in a 5 cm cell) of 0.780 and at 284 nm an absorbance of 0.710 after dilution (1:5). The absorbance at 284 nm is a measure of the hydroxymethyl furfural content of the mother liquor. The dextrose solution was successively passed through a column containing 200 milliliters of the strongly acid cation exchanger of Example II and a column containing 200 milliliters of the thiol resin of Example I at a percolation rate of 800 milliliters per hour and at a temperature of 60° C. After the two columns had been sweetened to 1° Bx, each time 400 milliliters of percolate were brought to the initial pH value of 4.4 with a 10%—$Na_2CO_3$ solution and the absorbance was measured (see Table 3).

TABLE 3

| Percolate | pH before neutralization | color absorbance (420 nm) | HMF-absorbance (284 nm) |
|---|---|---|---|
| 0– 400 ml | 1.9 | 0.290 | 0.255 |
| 400– 800 ml | 1.9 | 0.290 | 0.280 |
| 800–1200 ml | 1.9 | 0.305 | 0.320 |
| 1200–1600 ml | 1.9 | 0.330 | 0.320 |
| 1600–2000 ml | 1.9 | 0.330 | 0.320 |
| 2000–2400 ml | 1.9 | 0.335 | 0.330 |
| 2400–2800 ml | 1.9 | 0.350 | 0.335 |
| 2800–3200 ml | 1.9 | 0.365 | 0.335 |
| 3200–3600 ml | 1.9 | 0.375 | 0.340 |
| 3600–4000 ml | 1.9 | 0.400 | 0.365 |
| 4000–4400 ml | 1.9 | 0.410 | 0.375 |

EXAMPLE IV

The procedure of Example III was repeated, in such a way, however, that use was made of a thiol resin prepared in the following way: 100 grams of a styrene-divinyl benzene copolymer as described in Example I were swollen in a mixture of 300 milliliters of dichloroethane and 250 milliliters of chloromethyl ether. Over a period of 3 hours and at a temperature of 30° C. seventy (70) grams of anhydrous aluminium chloride were added batch-wise, with stirring, after which the reaction mixture was kept at a temperature of 40° C. for 2 hours. Subsequently, the reaction mixture was poured into water. The resulting chloromethylated copolymer was then heated for 3 hours at a temperature of 90° C., in the presence of an equal amount by weight of aqueous thiourea. After the thiourea adduct had been washed out, it was hydrolysed by a 10% by weight—sodium hydroxide solution with heating, as a result of which the product contained thiol groups which are bonded to aliphatic carbon atoms. The resulting product contained 15% by weight of sulfur. By measuring the color absorbance at 420 nm and the HMF-absorbance at 284 nm of the purified solution, it could be established that relative to the unpurified solution the amounts of colored compounds and hydroxymethyl furfural (HMF) contained in the purified solution had been reduced by the percentages mentioned in Table 4.

TABLE 4

| Percolate | % color removal | % HMF removal |
|---|---|---|
| 0– 400 ml | 98.5 | 87.6 |
| 400– 800 ml | 96.9 | 70.9 |
| 800–1200 ml | 96.8 | 69.9 |
| 1200–1600 ml | 94.9 | 54.1 |
| 1600–2000 ml | 94.1 | 47.1 |

EXAMPLE V

The procedure of Example III was repeated in such a way that use was made of a thiol resin of which the SH-groups are in a

structure, which is in tautomeric equilibrium with the

structure. The thiol resin used was prepared by reacting 1 part by weight of a macroporous copolymer of acrylonitrile and 12% by weight of divinyl benzene having an apparent density of 0.65 with 0.8 parts by weight of ammonium hydrogen sulfide in dimethyl formamide over a period of 10 hours at a temperature of 40° C., in which reaction 40% of the original cyan groups were converted. By measuring the color absorbance at 420 nm and the HMF-absorbance at 284 nm, it could be established that relative to the unpurified solution the amounts of colored compounds and and hydroxymethyl furfural (HMF) in the purified solution had been reduced by the percentages mentioned in Table 5.

TABLE 5

| Percolate | % color removal | % HMF removal |
|---|---|---|
| 0– 400 | 99.2 | 92.1 |
| 400– 800 | 98.3 | 88.2 |
| 800–1200 | 97.9 | 84.7 |
| 1200–1600 | 95.9 | 77.4 |
| 1600–2000 | 92.7 | 68.9 |

EXAMPLE VI

The procedure of Example III was repeated in such a way that as a thiol resin a thiourea condensate resin was used. The resin was prepared by condensation for 1 hour at 60° C. of a mixture of 100 grams of thiourea, 300 grams of 40%-formalin and 25 grams of phenol, which mixture had been brought to a pH of 8. After termination of the reaction the mixture was formed into beads, hardened and washed with a 10%-hydrochloric acid solution. The percentages of removed colored compounds and hydroxymethyl furfural (HMF) were determined in the same way as in the Examples IV and V (see Table 6).

TABLE 6

| Percolate | % color removal | % HMF removal |
|---|---|---|
| 0– 400 ml | 95.9 | 95.1 |
| 400– 800 ml | 94.6 | 92.0 |
| 800–1200 ml | 91.5 | 88.9 |
| 1200–1600 ml | 88.3 | 86.7 |

EXAMPLE VII

The procedure of Example III was repeated in such a way that use was made of a macroporous copolymer of styrene and 8% by weight of divinyl benzene containing thioureido groups which had been prepared in the following way: The copolymer, which had an apparent density of 0.7, was provided with primary amino groups by aminomethylation. Subsequently, the product (1 part by weight, based on dry weight), which had an acid-binding capacity of 1200 milliequivalents per liter, was neutralized with hydrochloric acid and heated under pressure for 10 hours at 130° C. in the presence of 1 part by weight of ammonium thiocyanate. The resulting product was washed with water and a 6%-NaOH solution; it had a sulfur content of 9.5% by weight. The percentages removed colored compounds and hydroxymethyl furfural (HMF) were determined in the same way as indicated in the Examples V and VI (see Table 7). Table 7 also gives the pH values of the percolate prior to neutralization with the $Na_2CO_3$ solution. It appeared that this thiol resin is acid-binding.

Table 7

| Percolate | pH before neutralization | % color removal | % HMF removal |
|---|---|---|---|
| 0– 400 ml | 6.2 | 99.7 | 96.7 |
| 400– 800 ml | 6.0 | 99.2 | 91.6 |
| 800–1200 ml | 6.0 | 99.3 | 87.2 |
| 1200–1600 ml | 5.4 | 98.5 | 85.5 |
| 1600–2000 ml | 3.5 | 95.7 | 63.3 |

EXAMPLE VIII

In this Example a solution of a high-glucose fructose syrup (Isomerose) having a strength of 47.8° Bx and a pH of 3.8 was decolored. The solution showed an absorbance at 420 nm of 0.470 and an absorbance at 284 nm of 1.50 (measured on a 5° Bx solution). This solution was successively passed through a column containing 200 milliliters of the strongly acid cation exchanger of Example 2 and through a column containing 200 milliliters of the thiol resin according to Example I at a percolation rate of 400 milliliters per hour at a temperature of 60° C. After the two columns had been sweetened to 10° Bx, each time 400 milliliters of percolate were brought to the original pH value of 3.8. The percentages of removed colored compounds and hydroxymethyl furfural (HMF) were determined in the same way as indicated in the preceding Examples (see Table 8).

TABLE 8

| Percolate | % color removal | % HMF removal |
|---|---|---|
| 0– 400 ml | 95.3 | 76.9 |
| 400– 800 ml | 90.2 | 68.7 |
| 800–1200 ml | 89.4 | 63.0 |
| 1200–1600 ml | 91.9 | 67.0 |

EXAMPLES IX–XI

The procedure of Example I was repeated, however, in such a way that use was made of tap water having an average salt content of 6 meq/l and an absorbance in the range of 0.26–0.45 (260 nm) as a result of the presence of an organic substance which mainly consisted of humic acids, the absorbance being measured in a 5 cm cell. The tap water was successively passed through a column containing 200 milliliters of the glass-like cation exchanger of Example I and for removal of the organic substance through a column containing 200 milliliters of a thiol resin at a percolation rate of 3 liters per hour at a temperature of 20° C. In Example IX use was made of the thiol resin described in Example I; in Example X that mentioned in Example IV, while in Example XI the thiol resin of Example VII was applied. Every six hours the absorbance of the water emerging from the first and the second column was measured at 260 nm in a 5 cm cell.

The absorbance at 260 nm is a measure of the amount of organic substance (humic acids); the higher the absorbance the higher the amount of organic substance. The results are given in Table 9, from which it can be seen that the organic substance was removed by the thiol resin for, respectively, 60–73%, 78–98% and 78–100%.

Table 9

| Percolate after | Absorbance after 1st column | | | Absorbance after 2nd column | | |
|---|---|---|---|---|---|---|
| | Ex. 9 | Ex. 10 | Ex. 11 | Ex. 9 | Ex. 10 | Ex. 11 |
| 6 h | 0.36 | 0.33 | 0.31 | 0.10 | 0.01 | 0.02 |
| 12 h | 0.38 | 0.28 | 0.30 | 0.13 | 0.05 | 0.02 |
| 18 h | 0.38 | 0.26 | 0.30 | 0.12 | 0.02 | 0.03 |
| 24 h | 0.41 | 0.28 | 0.28 | 0.15 | 0.06 | 0.00 |
| 30 h | 0.45 | 0.29 | 0.30 | 0.18 | 0.04 | 0.03 |
| 36 h | 0.39 | 0.30 | 0.31 | 0.13 | 0.03 | 0.02 |
| 42 h | 0.40 | 0.27 | 0.33 | 0.14 | 0.05 | 0.04 |
| 48 h | 0.41 | 0.28 | 0.32 | 0.15 | 0.04 | 0.04 |
| 54 h | 0.39 | 0.31 | 0.29 | 0.14 | 0.06 | 0.06 |
| 60 h | 0.40 | 0.31 | 0.30 | 0.14 | 0.06 | 0.05 |
| 66 h | 0.42 | 0.29 | 0.28 | 0.16 | 0.06 | 0.03 |

EXAMPLE XII

The procedure of Example I was repeated, in such a way, however, that use was made of phenol-containing water with a phenol concentration of 250 milligrams per liter which was passed through the two columns at a percolation rate of 800 milliliters per hour and at a temperature of 15° C. The sulfonic acid cation exchanger did not lead to a decrease of the phenol concentration in the water. The thiol resin caused the phenol concentration to decrease to a value lower than 0.2 mg per liter. The moment the phenol content of the water, after it had passed through the second column, became higher than 0.2 mg/l the thiol resin had absorbed 10 grams of phenol per liter of the resin.

EXAMPLE XIII

Waste water from a textile dyeing plant containing 50 milligrams per liter of an alizarine dyestuff (Alizarine Red S) was successively passed through a column containing 200 milliliters of an acid cation exchanger and a column containing 200 milliliters of a thiol resin at a percolation rate of 600 milliliters per hour and at a temperature of 18° C. The cation exchanger and the thiol resin are identical with those described in Example I. The first column gave no decrease of the yellow color of the waste water. After passing through the column with the thiol resin the eluate visually proved to be completely colorless. Only after the passage of 600 milliliters of waste water was the original color maintained.

EXAMPLE XIV

A process stream in a viscose pulp plant was passed through a first column containing 200 milliliters of the acid cation exchanger mentioned in Example I at a percolation rate of 800 milliliters per hour at a temperature of 18° C. After the passage the process stream contained, per liter, 10 grams of acetic acid and 1 gram of furfural. After the process stream had passed through a second column containing 200 milliliters of the thiol resin mentioned in Example I at a percolation rate of 800 milliliters per hour the thiol resin proved to have absorbed 24 grams (96% of the totally available amount) of furfural per liter.

What is claimed is:

1. A process for removing an organic impurity from an aqueous solution consisting essentially of sequentially contacting the aqueous solution with an acid cation exchanger and subsequently with a polymer or polycondensate, which contains sulfur in the form of thiol groups bonded to carbon atoms.

2. The process of claim 1 in which the organic impurity is removed from an aqueous solution of carbohydrates and/or substances which may be obtained in the recovery and/or preparation of carbohydrates from intermediate products, end products and/or residual products.

3. The process of claim 2 in which the organic impurity is removed from an aqueous solution of saccharose.

4. The process of claim 2 in which the organic impurity is removed from an aqueous solution of sugars obtained by hydrolysis of cellulose.

5. The process of claim 2 in which the organic impurity is removed from an aqueous solution of lactulose.

6. The process of claim 2 in which the organic impurity is removed from an aqueous solution of starch hydrolysates.

7. The process of claim 1 in which the organic impurity is removed from an aqueous solution of a di- or polyalcohol or an oxidation product thereof.

8. The process of claim 1 in which the exchanger is a strongly acid cation exchanger containing sulfonic acid groups.

9. The process of claim 1 in which the thiol groups-containing polymer or polycondensate is built up of a monovinyl aromatic compound and of 0–80% by weight of a cross-linking monomer.

10. The process of claim 9 in which the thiol groups-containing polymer or polycondensate is built up of styrene as monovinyl aromatic compound.

11. The process of claim 9 in which the polymer or polycondensate contain a di- or polyvinyl aromatic compound as the cross-linking monomer.

12. The process of claim 11 in which the polymer or polycondensate contains technical divinylbenzene as divinyl aromatic compound.

13. The process of claim 1 in which the thiol groups-containing polymer or polycondensate is a phenol-formaldehyde resin.

14. The process of claim 1 in which the thiol groups-containing polymer or polycondensate contains at least 1200 meq. thiol groups or thiolate groups per liter of thiol resin.

* * * * *